United States Patent [19]
Hughes

[11] Patent Number: 5,241,839
[45] Date of Patent: Sep. 7, 1993

[54] EVAPORATOR FOR A REFRIGERANT

[75] Inventor: Gregory G. Hughes, Milwaukee, Wis.

[73] Assignee: Modine Manufacturing Company, Racine, Wis.

[21] Appl. No.: 690,611

[22] Filed: Apr. 24, 1991

[51] Int. Cl.⁵ ............................ F25B 39/02; F25B 41/06
[52] U.S. Cl. .................................... 62/515; 62/511; 62/525; 62/527; 62/504; 165/174
[58] Field of Search ............... 62/504, 511, 515, 525, 62/527; 165/174, 176

[56] References Cited

U.S. PATENT DOCUMENTS

| | | | |
|---|---|---|---|
| 3,120,743 | 2/1964 | Wilson | 62/525 X |
| 3,795,259 | 3/1974 | Brandin et al. | 62/525 X |
| 3,864,938 | 2/1975 | Hayes, Jr. | 62/525 X |
| 4,274,482 | 6/1981 | Sonoda | 62/525 X |
| 4,379,486 | 4/1983 | Kurihara | 62/525 X |
| 4,502,297 | 3/1985 | Winterer | 62/515 |
| 4,513,587 | 4/1985 | Humpolik et al. | 165/174 X |
| 4,561,040 | 12/1985 | Eastman et al. | 165/80.4 X |
| 4,593,539 | 6/1986 | Humpolik et al. | 62/525 X |
| 4,825,941 | 5/1989 | Hoshino et al. | 165/176 X |
| 5,022,464 | 6/1991 | Aoki et al. | 165/176 X |

*Primary Examiner*—Henry A. Bennett
*Assistant Examiner*—C. Kilner
*Attorney, Agent, or Firm*—Wood, Phillips, VanSanten, Hoffman & Ertel

[57] ABSTRACT

Inefficiencies in an evaporator for a refrigerant in a refrigeration or air-conditioning system may be avoided in an evaporator having a plurality of tubes (18) in fluid and geometrical parallel through which the refrigerant may pass by providing a refrigerant distributor between an inlet (26) and the tubes (18) which includes an orifice (86) connected to the inlet (26) for directing a stream of refrigerant toward a flat impingement surface (102) from which it is disbursed to a plurality of receiver passages (34) angularly spaced about the periphery of the impingement surface (102) and respectively connected by a fluid passage (38, 44, 50) to an associated one of the tubes (18).

9 Claims, 4 Drawing Sheets

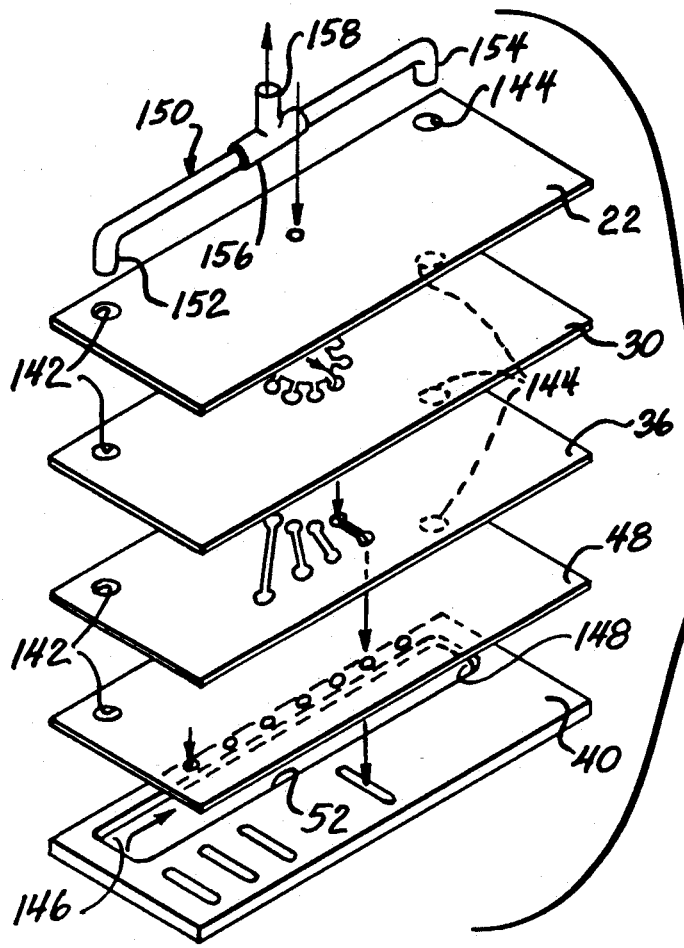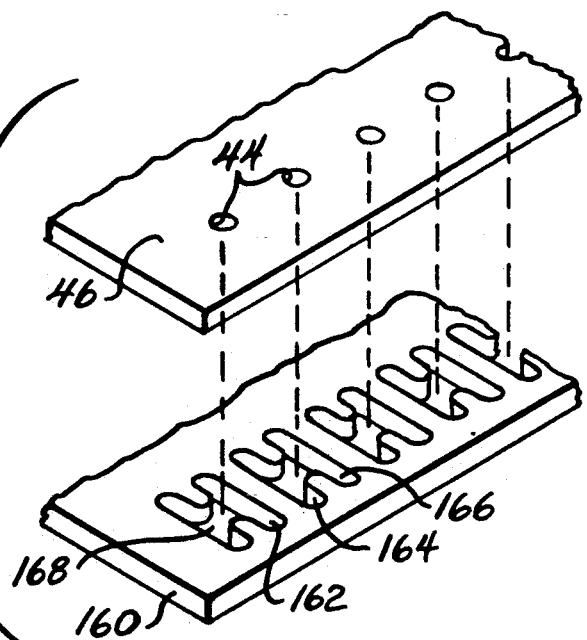

EVAPORATOR FOR A REFRIGERANT

FIELD OF THE INVENTION

This invention relates to evaporators, and more particularly, to evaporators that are employed to evaporate a refrigerant in a refrigeration or air-conditioning system.

BACKGROUND OF THE INVENTION

In the last decade or so, considerable effort has been expended to improve the fuel efficiency of vehicles. This effort has resulted in virtually every component of a vehicle being reviewed for its effect on fuel economy. In general terms, the main focus has been on the weight of the component and on the effect of a component on vehicle aerodynamics, that is, on the drag coefficient of the vehicle.

In many instances, a given component will affect one or the other, but not both, of the above considerations. In other cases, a given component can have an effect on both. Examples in the latter category include many of the heat exchangers employed in a vehicle as, for example, radiator and air-conditioning system components.

Such components add weight to the vehicle and to the extent that their volume may affect the frontal area or some other part of the vehicular envelope, the drag coefficient as well. Consequently, there is an ongoing effort to not only reduce the weight of such heat exchangers as by switching to light weight components, but to reduce the volume as well since such will not only be accompanied by a reduction in weight, but may permit a reduction in some part of the envelope of the vehicle which allows a reduction in the drag coefficient.

At the same time, the heat exchange capabilities of a system including such components does not diminish and may even increase. Consequently, a reduction in the size of the heat exchanger which would, all other things being equal, reduce the heat exchange capability of the system in which it is used, must be offset or compensated for by increased efficiency. For if efficiency cannot be improved, in order to meet the heat exchange requirements of a given system, desired size reductions cannot be accomplished and weight reduction efforts will be limited to the availability of lighter weight components that may be substituted for those currently in use.

While over the years there have evolved a number of set techniques that may tend to increase heat exchanger efficiency, in many respects, attempts to use these techniques to obtain greater efficiency in refrigeration or air-conditioning systems simply are not successful because of the fact of two-phase flow in a system heat exchanger such as the condenser or evaporator. That is to say, because heat exchangers of these types are dealing with a refrigerant that will be partly in the liquid phase and in part in the vapor phase, techniques that may produce an increase in efficiency in single phase units such as vehicular radiators are inapplicable. And even condensers and evaporators behave quite differently from one another and require assessment of different situations. For example, in an evaporator, condensate from humid air passing through the evaporator core will form on the core itself. The condensate is a far poorer thermal conductor than the aluminum components of which evaporators for vehicles are typically formed. As a consequence, if condensate is permitted to remain on fins and tubes of an evaporator, since heat must pass from the ambient air to the fins and tubes through the condensate before evaporation of the refrigerant can take place, the condensate impedes heat transfer and thus reduces efficiency. Furthermore, particularly with relatively high fin densities, the condensate may block air flow through the core. With reduced air flow, efficiency is further reduced.

And, in worst case situations, the condensate may actually freeze to solidify the poor thermally conducting layer surrounding the fins and provide an immovable obstacle to the passage of air through the core.

Refrigerant flow through an evaporator is also of concern. If a greater mass of refrigerant is flowing through a specific part of an evaporator, a cold spot will result. Such a cold spot can result in condensate freezing at that location. In the alternative, the existence of a cold spot is indicative of the remainder of the evaporator not performing at optimum efficiency.

The present invention is directed to solving one or more of the above problems.

SUMMARY OF THE INVENTION

It is a principal object of the invention to provide a new and improved evaporator. More specifically, it is an object of the invention to provide such an evaporator for use in a refrigeration or air-conditioning system. According to the invention, the evaporator is highly suitable for use in vehicular applications.

According to one facet of the invention, there is provided an evaporator for a refrigerant which includes an evaporator circuit having an inlet, an outlet and a plurality of hydraulically parallel flow paths extending between the inlet and the outlet. Means are provided in the circuit for at least nominally equalizing refrigerant flow through each of the flow paths.

In a preferred embodiment, the equalizing means includes a distributor in the circuit downstream of the inlet and upstream of the hydraulically parallel flow paths.

The invention also contemplates that the equalizing means include additional flow paths of unequal dimension.

In a preferred embodiment, the unequal dimension is unequal length.

In a highly preferred embodiment of the invention, the evaporator includes means defining a plurality of elongated passages in fluid parallel through which a refrigerant may pass while evaporating therein. First and second manifolds are provided with one connected to the passages at one end thereof and the other connected to the passages at the other end thereof. An inlet is provided to one of the manifolds and an outlet is also provided to one of the manifolds. A refrigerant distributor is located between the inlet and the associated manifold and includes a flat impingement surface. An orifice is connected to the inlet and oriented to direct a stream of refrigerant toward the surface generally normal thereto. A plurality of receiver passages are angularly spaced about the periphery of the impingement surface and each is in fluid communication with the manifold for distributing refrigerant throughout the one manifold in a predetermined fashion.

Preferably, the number of the elongated passages is a multiple "n" of the number of the receiver passages where "n" is an integer of 1 or more and each receiver passage is connected by the one manifold to "n" elongated passages.

The invention contemplates that the periphery of the impingement surface be generally circular.

The invention also contemplates that the impingement surface be planar.

In a preferred embodiment, the receiver passages are equally angularly spaced about the periphery of the impingement surface.

Preferably, the orifice, the manifolds and the passages are sized so that the pressure drop of refrigerant flowing in the evaporator across the orifice, the receiver passages and the passages to the outlet is at least about ⅓ of the total pressure drop from the system condenser outlet to the evaporator outlet at the maximum design cooling load.

In a highly preferred embodiment, each of the elongated passages is defined by an elongated tube. The tubes are spaced in parallel to each other and further extend between the manifolds. Fins are disposed between adjacent ones of at least some of the tubes.

An evaporator made according to the invention may also include an evaporator core having a plurality of spaced, hydraulically parallel flow paths, each defined by one or more elongated tubes with each tube having an inlet end and an opposed outlet end. The tubes are spaced from and parallel to each other and fins extend between at least some of the tubes. The evaporator is provided with an inlet fitting and an outlet fitting and distributor means interconnect the inlet fitting and at least some of the inlet ends of the tubes for distributing refrigerant from the inlet to the associated tubes. Collector means interconnect the outlet fitting and at least some of the outlet ends for collecting refrigerant passing from the associated tubes.

According to the invention, the distributor means and the collector means further define equalizing means for at least nominally equalizing the length of travel of refrigerant flowing from the inlet fitting to the outlet fitting through each of the plurality of flow paths.

In a preferred embodiment, the core includes central tubes flanked by end tubes. The refrigerant travel length from the inlet fitting through the distributor means to the tube inlet ends is shorter for the central tubes than for the end tubes and the refrigerant travel length from the collector means at the tube outlet ends to the outlet fitting is greater for the central tubes than for the end tubes.

According to still another facet of the invention, there is provided an evaporator which includes an evaporator core including at least one row of spaced parallel tubes terminating in open ends disposed in the header plate and having fins extending between the tubes. A divider plate is sealed against the header plate and has a row of spaced apertures therein. One aperture is provided for each tube or a group of tubes in a tube row and each is aligned with a corresponding tube or group of tubes in the tube row. A circuit and distributor plate means is sealed against the divider plate oppositely of the header plate and has a plurality of slots therein. One end of each of the slots is aligned with and in fluid communication with a corresponding one or a predetermined group of the apertures. The other ends of the slots are angularly spaced about an opening. The opening is aligned with an imperforate section on one of the plates which defines a flat impingement surface. A cover plate is sealed against the circuit and distributor plate means and closes the opening opposite of the impingement surface. Means are provided in the cover plate which are aligned with the opening and serve as a refrigerant inlet to the evaporator. Such means direct incoming refrigerant generally centrally of the opening and against the impingement surface generally normally thereto.

In a preferred embodiment, the circuit and distributor plate means include a circuit plate having the slots and a distributor plate having the opening. The circuit plate and the distributor plate are abutted and sealed together.

In a highly preferred embodiment, there are at least two rows of the tubes having open ends terminating in the header plate. The evaporator further includes a manifold plate located between the header plate and the divider plate with the manifold plate having openings establishing fluid communication between the apertures in the divider plate and a corresponding one or a predetermined group of the open ends of tubes in one of the tube rows. An elongated outlet slot is formed in the manifold plate to be aligned with the open ends of the tubes in the other of the tube rows and at least one outlet conduit is connected to the outlet slot.

In a highly preferred embodiment, the outlet conduit has a single outlet opening connected to the outlet slot at two spaced locations along the length of the outlet slot. Preferably, the spaced locations are at opposite ends of the outlet slot.

Other objects and advantages will become apparent from the following specification taken in connection with the accompanying drawings.

DESCRIPTION OF THE DRAWINGS

FIG. 11 is a fragmentary, exploded view of a modified embodiment of the invention; and FIG. 12 is a fragmentary, exploded view of still another modified embodiment.

DESCRIPTION OF THE PREFERRED EMBODIMENT

Figure 1:
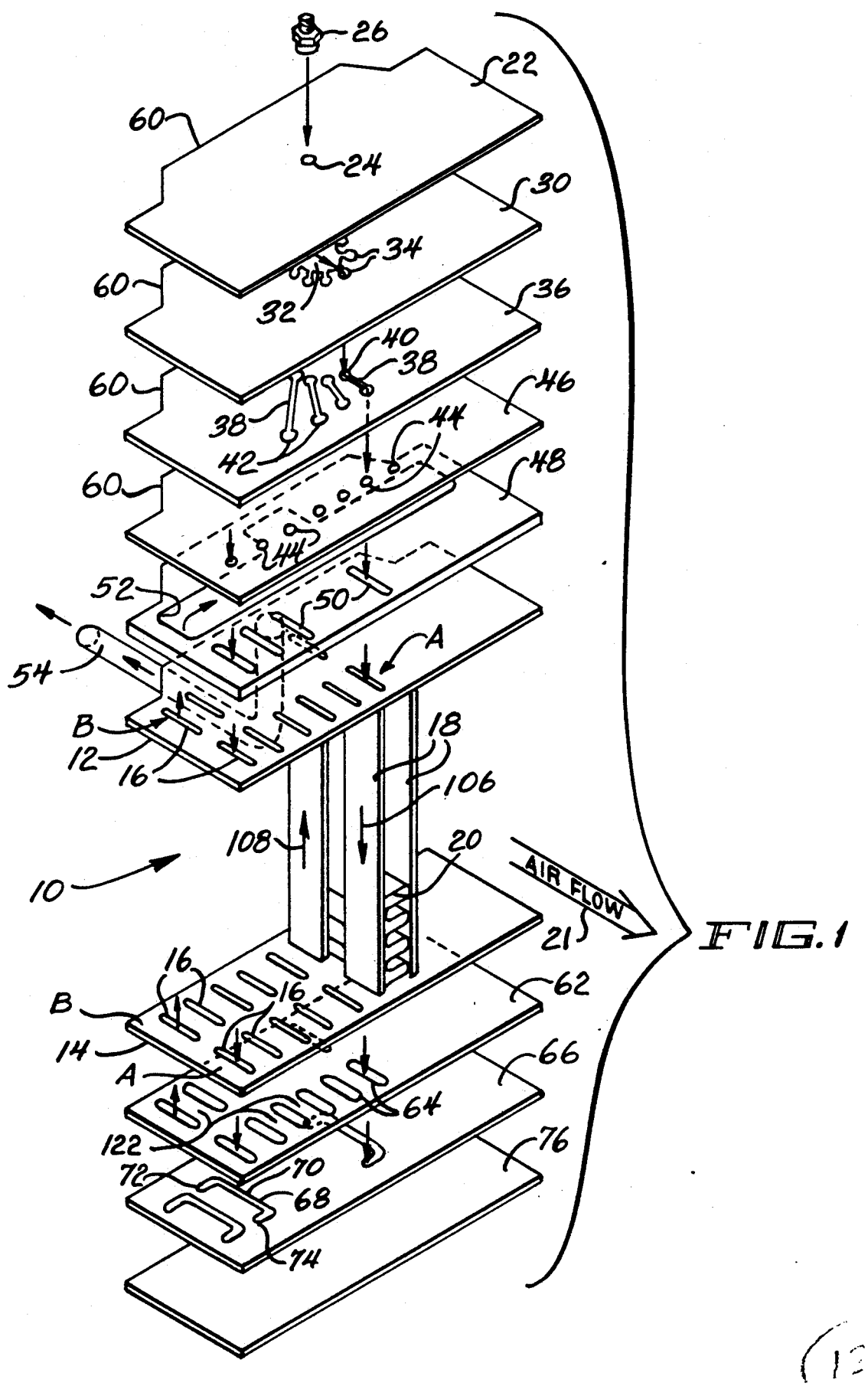
FIG. 1 is an exploded view of an evaporator made according to the invention.

An exemplary embodiment of the evaporator is illustrated in FIG. 1 in the form of a two-pass evaporator. However, it is to be understood that many of the principles of the invention are equally applicable to single pass evaporators or to evaporators having more than two passes.

The evaporator includes a core, generally designated 10, which includes first and second header plates 12 and 14. The header plates 12 and 14 are spaced in parallel and each includes two rows of elongated slots 16. As viewed in FIG. 1, a forward row is labeled A while the rearward row if labeled B.

Two rows of flattened tubes 18 extend between and have opposed open ends received in aligned ones of the slots 16 in the header plates 12 and 14. Serpentine fins 20 extend between and are bonded to the tubes 18 in each of the rows A and B. In some cases, one set of the fins 20 may extend between adjacent, aligned tubes 18 in both of the rows A and B as illustrated in FIG. 1. Air flow through the core is in the direction of the arrow 21.

Figure 9:
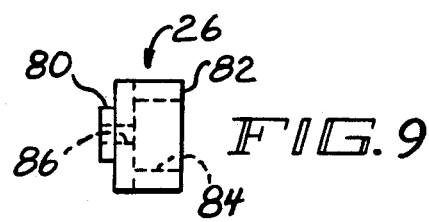
FIG. 9 is a side view of an orifice and inlet fitting employed at the inlet of the evaporator.
Figure 10:
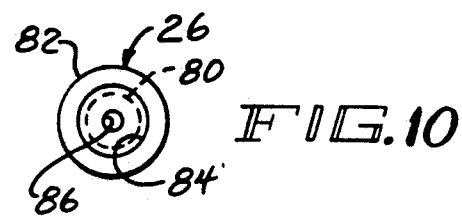
FIG. 10 is an end view of the fitting.

On the inlet end of the evaporator, the same includes a cover plate 22 which is imperforate except for an opening 24. An inlet fitting 26 which is illustrated in greater detail in FIGS. 9 and 10 is sealingly fitted into the opening 24 and is connected to the refrigeration or air-conditioning system in a conventional fashion, that is, to the downstream side of an expansion valve or a capillary (neither one of which is shown).

A distributor plate 30 underlies the cover plate 22. In assembled relation, the two will be sealed together. The distributor plate includes a generally central opening 32 surrounded by a series of pockets 34 which are used for purposes to be seen.

Bonded to the distributor plate oppositely of the cover plate is a circuit plate 36. The circuit plate 36 includes a plurality of elongated slots 38 which have ends 40 aligned with corresponding ones of the pockets 34 in the distributor plate 30. Opposite ends 42 of the slots 38 are aligned with one or a predetermined group of apertures 44 in a divider plate 46 which is sealed to the circuit plate 36 opposite of the distributor plate 30.

The assemblage of plates thus far described is in turn sealed to the header 12 via an intermediate spacer or manifold plate 48. The manifold plate 48 includes a series of slots 50 that serve to establish fluid communication between the apertures 44 in the divider plate and the open ends of the tubes 18 at the header 12. In addition, the manifold plate 48 includes an elongated outlet slot 52 which is connected to an outlet conduit 54 as will be seen.

In this respect, for the particular embodiment of evaporator illustrated in FIG. 1, each of the plates 12, 22, 30, 36, 46 and 48 includes a rearwardly extending tongue 60 which is required only for the particular configuration of the elongated slots 38 and 52 illustrated and may be omitted in a number of other instances.

Turning now to the header plate 14, a spacer plate 62 is bonded to the same oppositely of the tubes 18. The spacer plate 62 includes a pair of rows of elongated slots 64 alignable with the slots 16 in the header plate 14. In order to provide for a two pass evaporator, sandwiched against the spacer plate 62 oppositely of the header plate 14 is a return manifold plate 66. The return manifold plate includes a plurality of shallow U-shaped slots 68. The slots 68 have a bight 70 and two opposed legs terminating in ends 72 and 74. The ends 72 align with the centers of the slots 16 in the tube row B in the header plate 14 while the ends 74 align with corresponding ones of the slots 16 in the tube row A. The bights 70 are located so as to fall between the slots 64 in the two tube rows.

The assemblage is then completed by an imperforate cover plate 76 bonded to the return manifold plate 66 oppositely of the spacer plate 62.

In a highly preferred embodiment, all components are made of aluminum because of its relatively light weight and good thermal conductivity. Bonding and sealing of the various components together is achieved by brazing through any of a variety of well-known brazing methods. In this regard, at the various interfaces of the separate components, brazing alloy will be located. Usually, it will be in the form of cladding. Thus, for example, a bond seals the cover plate 22 to the distributor plate 30, and either the lower surface of the cover plate 22 or the upper surface of the distributor plate 30 will typically be braze clad. Similarly, braze cladding will typically be located at the interface of each of the plates on one or the other of the surfaces defining each such interface.

In addition, braze cladding may be located on the tubes 18 to assure their being bonded and sealed within the slots 16 as well as to provide a means of bonding the fins 22 to the tubes 18.

In some cases some of the plates can be combined or made of multiple pieces as desired for manufacturing ease. Additionally, some of the formations may be embossed rather than cut, stamped or drilled.

FIGS. 2-8, inclusive will now be described to provide greater detail of the various plates requiring further description. It is to be particularly noted that each of these figures is to the same scale so that the relative orientation of components may be readily ascertained simply by superimposing one over the other.

Figure 2:
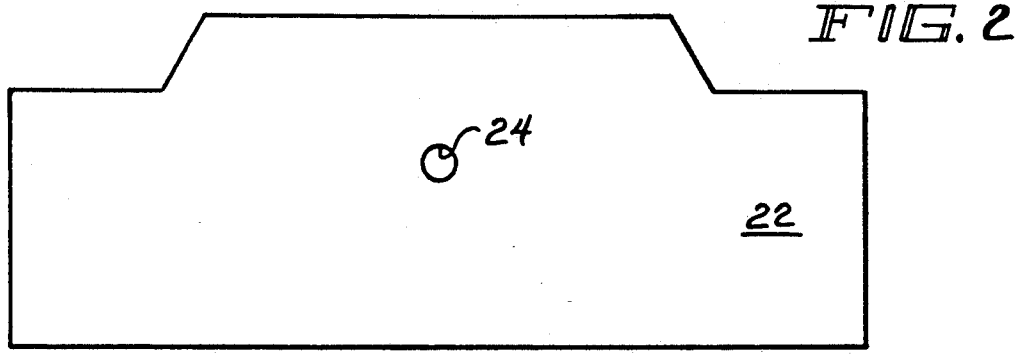
FIG. 2 is a plan view of a cover plate used in the evaporator.
Figure 3:
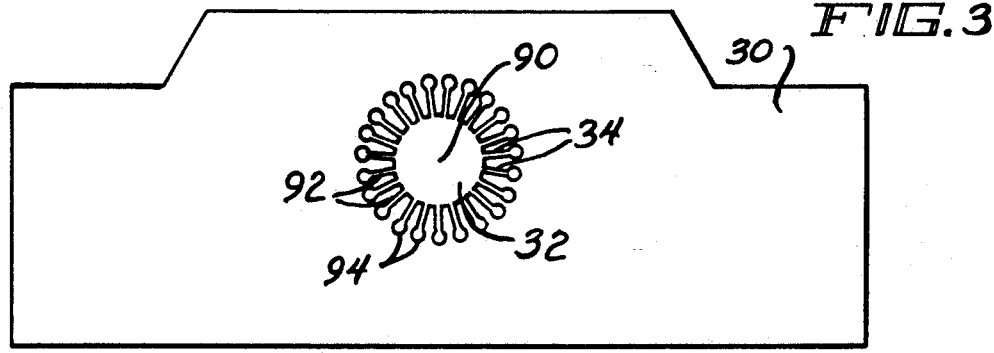
FIG. 3 is a plan view of a distributor plate used in the evaporator.

FIG. 2 illustrates the cover plate 22 and the opening 24 therein. It will be recalled that the opening 24 receives the fitting 26 which in turn is illustrated in Figs. 9 and 10. The fitting 26 includes a reduced diameter portion 80 having an axial length that is approximately equal to the thickness of the cover plate 22 and which is of approximately the same diameter as the opening 24. Oppositely of the reduced diameter section, the fitting 26 includes an enlarged diameter end 82 with an internal cavity 84 for receipt of a conduit. An orifice 86 is located on the axis of the fitting 26 and when the fitting 26 is firmly bonded within the opening 24, the orifice 86 will be directed at the center 90 of the opening 32 in the distributor plate 30 in a direction normal thereto. The opening 32 is generally circular and the pockets 34 are equally angularly spaced about the opening 32 as can be seen in FIG. 3. Each pocket 34 is defined by a radial slot 92 terminating in a circular end 94.

Figure 4:
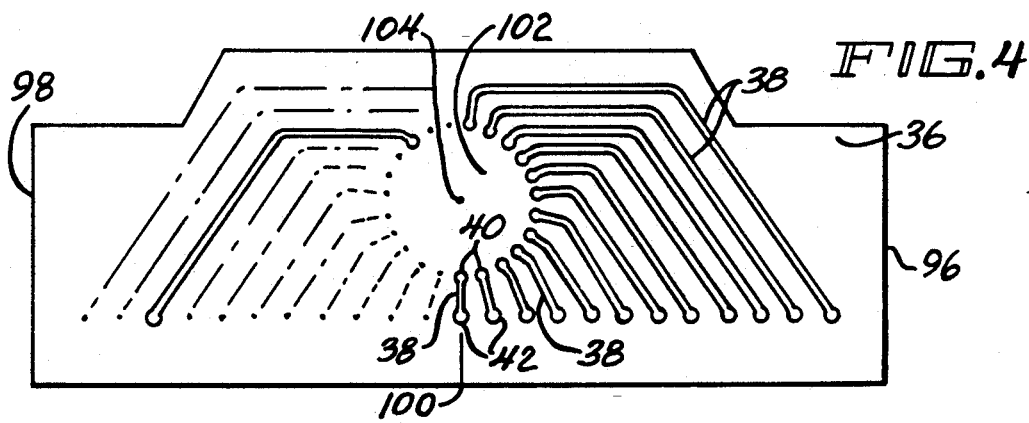
FIG. 4 is a plan view of a circuit plate used in the evaporator.

Considering now FIGS. 3 and 4, the circular ends 94 of each of the pockets 34 align with the inner ends 40 of the elongated slots 38 in the circuit plate 36. The ends 40 are, as can be seen in FIG. 4, circular as are the outer ends 42 of the slots 38.

It will be observed from FIG. 4 that the ends 40 of the slots 38 are in a circular array and equally angularly spaced to align with the ends 94 of the slots 92 while the ends 42 are located in a straight line row. This, of course, dictates that the slots 38 have unequal lengths and for the particular configuration shown, the longer of the slots 38 are located adjacent the ends 96 and 98 of the circuit plate 36 while the shortest slot is located at the center 100 (in relation to the ends 96, 98) of the plate 36. Slot length increases as one progresses from the center of the plate 36 towards either of the ends 96 or 98 as can be readily appreciated from FIG. 4.

Figure 5:
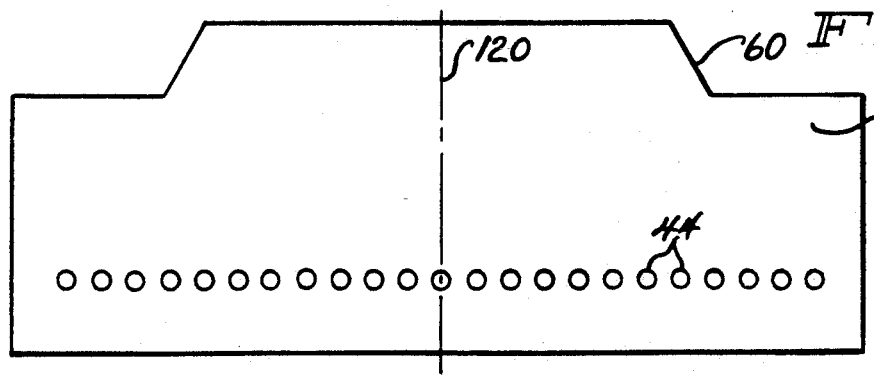
FIG. 5 is a plan view of a divider plate used in the evaporator.

FIG. 5 illustrates the divider plate 46 in greater detail and as noted previously, the same includes a plurality of apertures 44 located in a single row. The arrangement is such that the apertures 44 align with the ends 42 of the slots 38 in the circuit plate 36 as well as with the centers of the slots 50 in the manifold plate 48. In this connection, it will be noted that the number of the slots 38 is equal to the number of the apertures 44 which in turn is equal to the number of the slots 50 which in turn will be equal to the number of the tubes 18 in tube row A.

The purpose of this construction is to distribute incoming refrigerant received through the fixture 26 to the hydraulically parallel flow paths represented by the tubes 18 as nearly equally as possible. The orifice 86 acts as a means to increase the velocity of the incoming stream which then impinges upon an imperforate, generally circular surface section 102 of the circuit plate defined by the ends 40 of the slots 38. This impingement surface is flat, and more specifically, planar; and the incoming stream, as noted earlier, impinges upon the same in a direction generally normal (i.e., 90°) on the center 104 of the area. The refrigerant is deflected generally uniformly about 360° and as a consequence, a substantially equal amount of refrigerant is directed to each of the pockets 34 and thus to the slots 38 and ultimately to the tubes 16 in the tube row A. Thus, there is a substantially equal mass of refrigerant flowing through each of the tubes in row A in the direction of an arrow 106 (FIG. 1) and which is returned through the tubes 18 in row B in the direction of an arrow 108 to provide a two-pass evaporator with good refrigerant distribution from one side of the core 10 to the other. With good uniformity and distribution, cold spots and the associated problems and/or inefficient use of other parts of the core are avoided.

To further ensure good distribution, it is desirable that a greater proportion of the incoming refrigerant be in the liquid phase than in conventional evaporators. In a conventional R12 system, the pressure drop from the condenser outlet to the evaporator outlet 54 would be on the order of 200-250 psi. Conventionally, then, the pressure drop from the fitting 26 to the outlet 54 would be on the order of 3-15 psi. However, by appropriately sizing the orifice 86, a relatively high pressure drop from the fitting 26 to the outlet 54 is caused to exist and typically will be on the order of about 80 psi or more at maximum design cooling load. For refrigerants other than R12, the various pressure will, of course, vary somewhat. In general terms, the "relatively high pressure drop" across the fitting 26 and the core 10 envisioned by the invention will be about ⅓ or more of the pressure drop from the outlet of the condenser in the system to the outlet of the evaporator at maximum design cooling load. Again, however, this value may vary somewhat dependent upon the refrigerant actually used.

This results in a lesser pressure drop from the expansion valve or capillary to the fixture 26 with the result that more of the refrigerant remains in the liquid phase at the time it reaches the fitting 26. Thus, a greater percentage of the refrigerant will be in the liquid state when it impinges upon impingement surface 102 and this in turn results in better refrigerant distribution. And, as mentioned previously, the use of the orifice to increase the velocity of the incoming stream results in impingement on the surface 102 at a high velocity which in turn maximizes disbursement of the liquid refrigerant as well to provide excellent distribution.

Figure 6:
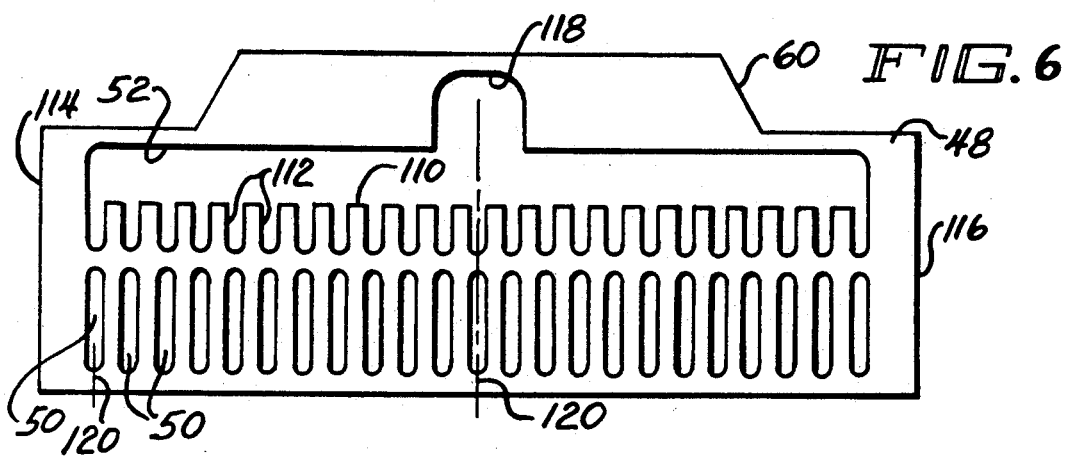
FIG. 6 is a plan view of a manifold and spacer plate used in the evaporator.

Continuing with the description of the manifold plate 48, it will be recalled that the elongated outlet slot 52 is located so as to be aligned with the header slots 16 in the tube row B of the header 12. As illustrated in FIG. 6, if desired, one side 110 of the slot 52 may have a serrated appearance formed by half slots 112 formed much like half of the slots 50 and which join to the elongated slot 52.

Centrally between the ends 114 and 116 of the manifold plate 48, and on the side of the elongated slot 52 remote from the slots 50, within the tongue 60 there is provided a notch-like slot 118. As can be appreciated from a consideration of FIG. 5, the upper side of the notch-like slot 118 will be closed by an imperforate area 120 on the tongue 60 of the divider plate 46.

At the same time, however, an opening 122 in the tongue 60 of the header plate 12 will underlie the notch-like slot 118 and may sealingly receive an end of the outlet conduit 54. Thus, refrigerant passing in the direction of the arrow 108 (FIG. 1) in the tubes 18 of the tube row B will flow into the elongated slot 52 and then to the notch-like slot 118. At this point, the refrigerant will enter the opening 122 and the header plate 12 and the outlet conduit 54 associated therewith.

Figure 7:
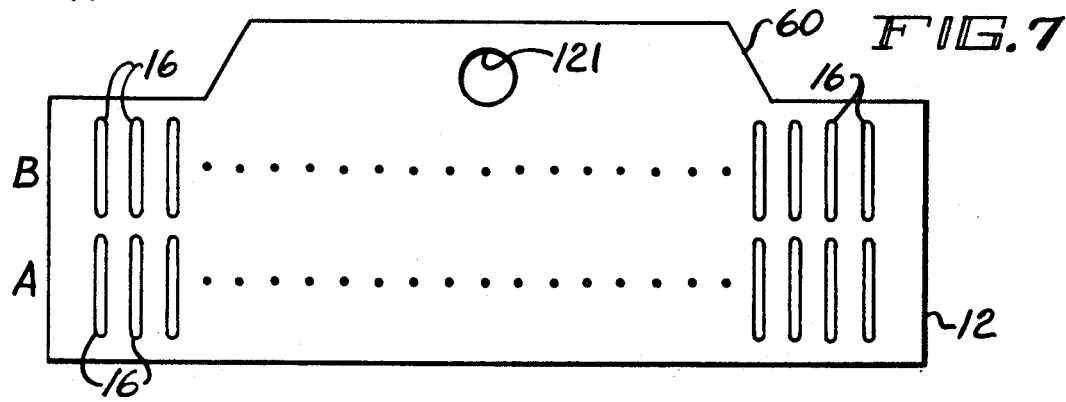
FIG. 7 is a plan view of a header plate used in the evaporator.

The header plate 14, which is on the opposite open ends of the tubes 18 from the header plate 12, may be configured substantially identically to the header plate 12 shown in FIG. 7, although the tongue 60 and the opening 121 may be omitted to save in material and forming operations.

Similarly, the spacer plate 62 may be formed somewhat like manifold plate 48 except that the elongated slot 52 is replaced with a second row of the slots 50. The notch-like slot 118 will, of course, be eliminated and again, the tongue 60, may be eliminated to reduce the material required to form the spacer plate 62.

Figure 8:
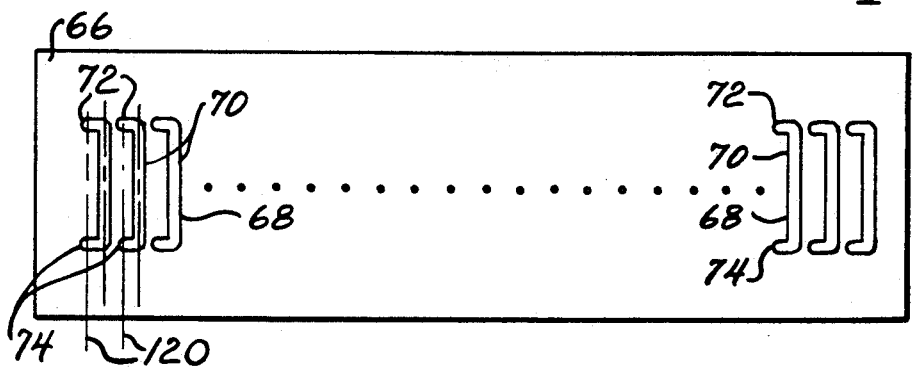
FIG. 8 is a plan view of a return manifold plate used in the evaporator.

FIG. 8 illustrates the return manifold plate 66 and the U-shaped slots 68 therein. As alluded to previously, the ends 72 and 74 should fall on the centerlines of the slots 64. These centerlines 120 are shown in FIG. 6 in relation to the slots 50 rather than the slots 64 as they are substantially identical. The centerlines are carried over into FIG. 8 and labeled 120 therein In addition, the bights 70 of the slots 68 should align with area 122 (FIG. 1) between the slots 64. Thus, refrigerant moving in the direction of the arrow 106 in FIG. 1, as it exits each tube 18 in the tube row A, is brought toward the center thereof to the end 74 of a corresponding one of the slots 68. The fluid then passes through the bight 70 of a slot 68. The upper and lower boundaries of the bight 70 are, of course, closed respectively by the spacer plate 62 and the cover plate 76.

The refrigerant is then reintroduced into a corresponding one of the tubes 18 in the tube row B at the center of each such tube so that it may flow upwardly in the direction of the arrow 108 as shown in FIG. 1 and ultimately to the outlet conduit 54 as mentioned previously.

By locating the ends 72 and 74 at the centers of the cross sections of the flattened tubes 18, equalized distribution of the refrigerant is promoted.

The cover plate 76 may be substantially identical to the cover plate 22 except that the opening 24 will be omitted. In addition, it is generally desirable to omit the tongue 60 to save on material.

In order to further enhance and equalize refrigerant distribution provided by the distributor formed by the orifice 86, the distributor plate 30 and the impingement surface 102 in connection with the pockets 34, another feature of the invention to be described may be employed. Considering the arrangement of the slots 38 and their respective lengths as viewed in FIG. 4 in relation to the tubes 18 in the core 10, it will be appreciated that the length of the flow paths defined by the slots 38 to the centermost ones of the tubes 18 in the tube row A is shorter than the length of the flow path defined by the slots 38 to the endmost ones of the tubes 18 in the tube row A which flank the centermost tubes; and that there is a progressive increase in length as one proceeds from the center 100 of the circuit plate to either end 96 or 98 thereof, all as mentioned previously. Thus, without more, the flow paths that include the endmost tubes 18 from the fitting 26 to the point whereat the tubes in the tube row B empty into the elongated slot 52 in the manifold plate 48 will be longer than the flow path for more centrally located tubes 18. To the extent that resistance to refrigerant flow is proportional to the length of the flow path, the greater resistance of the longer flow paths will result in less refrigerant passing through such longer flow paths per unit of time thereby adversely affecting uniformity of distribution through the various flow paths. Consequently, where even greater uniformity of distribution than is provided by the embodiment of the invention thus far described is desired, the alternative embodiment illustrated in FIG. 11 may be used. In this embodiment, the manifold plate 48 as well as the superimposed plates 22, 30, 36 and 46 are somewhat modified as follows. Firstly, the notch-like slot 118 in FIG. 6 is eliminated to provide a modified manifold plate 140 as viewed in FIG. 11.

Secondly, the cover plate 22, the distributor plate 30, the circuit plate 36, and the divider plate 48 are each provided with a pair of apertures 142 and 144 near their upstream corners. The apertures 142 and 144 on each of the plates are aligned with each other and in turn are aligned with the ends 146 and 148 of the elongated slot 52 in the modified manifold plate 140.

An outlet fitting or conduit, generally designated 150 is utilized in lieu of the conduit 54 (FIG. 1) and includes a first end 152 to be received and sealed to the opening 142 in the cover plate 22. A second end 154 is received and sealed to the opening 144 in the cover plate 22. Midway along the length of the conduit or fixture 150 is a tee 156 which connects to both of the ends 152 and 154 and which provides a single outlet opening 158. This structure provides for two spaced collection points on the outlet side of the evaporator and it will be observed that the points are at the ends 146 and 148 of the slot 52 rather than near the center of the slot 152 as in the embodiment as illustrated in FIG. 6. This in turn means that refrigerant entering the slot 52 of the modified manifold plate shown in FIG. 11 from central ones of the tubes 18 will have a further distance to travel to the collection points defined by the ends 152 and 154 than will fluid entering the slot 52 in the plate 140 after flowing through tubes 18 that are closer to the ends or sides of the core 10.

It will also be recalled that this arrangement is just the opposite of what occurs with flow through the slots 38 in a circuit plate 36 and the net result is that the lengths of all flow path from the impingement surface 102 (FIG. 4) to the outlet 158 will be nominally equalized. That is to say, the shorter flow paths on the inlet end to the core 10 are offset with longer flow paths from the core 10 to the outlet 158 on the outlet side of the evaporator so that the lengths of all flow paths are nominally equalized to thereby nominally equalize the resistance to flow through each. With nominally equal flow resistance in each, assuming good distribution by the distributor, excellent equalized flow distribution of refrigerant throughout the many parallel flow paths is achieved to achieve the efficiencies that accompany the same.

As described so far, there is a slot 38 employed for each tube 18 in the tube row A of the evaporator (FIG. 1). In some cases, it may be desirable to reduce the number of slots 38 without reducing the number of tubes 18 in the tube row A or increase the number of tubes 18 without increasing the number of slots 38. In this case, each one of the slots 38 may be made to serve two or more of the tubes 18. One means by which this might be accomplished is to reduce the number of slots 38 while making those that are retained multi-ended with a plurality of the ends 42. For example, if the number of slots 38 were to be halved, then the remaining slots would each be provided with two of the ends 42, the resulting split ends being located in the same positions illustrated in FIG. 4. Alternatively, however, and preferably, the arrangement illustrated in FIG. 12 will be employed. In this case, the number of slots 38 is reduced to the desired number as are the number of the apertures 44 in the divider plate. Instead of utilizing separate slots 50 in the manifold plate 48 as illustrated in FIG. 1, a modified manifold plate 160 is utilized. The modified manifold plate 160 is provided with a series of H-shaped slots 162. Each slot 162 has parallel sides 164 and 166 which align with adjacent slots 16 in the header plate 12. The apertures 44 in the divider plate are located to be aligned with the cross member section 168 of each H-shaped slot 162. As a consequence of this construction, each one of the slots 38 in the circuit plate 36 will provide refrigerant to two of the tubes 18 in the tube row A. This allows a simplification of the construction of the distributor and is obviously applicable to the situation where the H-shaped slots 162 are further expanded to serve three or even four of the tubes 18 in the tube row A.

Evaporators made according to the invention maintain or improve performance over conventional counterparts, are of smaller volume, and exhibit favorable air side pressure drops. For example, three conventional, commercially available cores were tested and measured. One had a depth of approximately 4 inches and a heat transfer of 14,300 BTU/hr with an air side pressure drop of 0.42 psi. This evaporator was a serpentine evaporator.

Two drawn cup evaporators, one having a depth of 3.4 inches and the other having a depth of 3.55 inches respectively showed heat transfer of 14,200 and 14,600 BTU/hr with air side pressure drops of 0.41 and 0.34 psi, respectively.

An evaporator made according to the invention employing a distributor made according to the invention and the single outlet configuration illustrated in FIG. 2 had a depth of approximately 2.46 inches, a heat transfer capability of 14,300 BTU/hr and an air side pressure drop of 0.39 psi. Another evaporator made according to the embodiment illustrated in FIG. 11 of the invention including two spaced collection points on the outlet side also had a core depth of 2.46 inches, but exhibited a heat transfer capability of 15,800 BTU/hr with an air side pressure drop of 0.37 psi.

Thus, in both cases, evaporators made according to the invention allowed a volume reduction of approximately one-third or more without any loss in heat transfer capability and with comparable air side pressure drops. Indeed, when the modified embodiment of FIG. 11 is employed, an approximate 10% increase in heat transfer is obtained along with the volume reduction. And since the reduction in volume is accompanied by a reduction in weight, it will be readily appreciated that evaporators made according to the invention represent a sizable advance over those heretofore known.

This surprising improvement is almost certainly due to extremely uniform distribution of refrigerant through the various parallel flow paths. Measurements taken of air exiting the downstream face of the core show a variation of less than 6° F. from side to side on such face and indicate the complete absence of cold spots. This along with the heat transfer measurements shows that all parts of the evaporator are being utilized to full capacity which in turn strongly suggests extremely uniform refrigerant distribution throughout the various flow paths.

I claim:

1. In an evaporator for a refrigerant, the combination of:
   means defining a plurality of elongated passages in hydraulic parallel through which a refrigerant may pass while evaporating therein;
   first and second heads, one connected to said passages at one end thereof and the other connected to said passages at another end thereof;
   an inlet to one of said headers;
   an outlet to one of said headers; and
   a refrigerant distributor between said inlet and the header having said inlet including a flat impingement surface, an orifice connected to said inlet and oriented to direct a stream of refrigerant toward said surface generally normal thereto, and plurality of receiver passages angularly spaced about the periphery of said impingement surface, each in fluid communication with said one header, for distributing refrigerant throughout said one header;
   said orifice, said headers and said passages defining means sized for causing the pressure drop of refrigerant flowing in said evaporator across said orifice and said passages to said outlet to be on the order of about ⅓ or more of the pressure drop from a condenser outlet to the evaporator outlet at maximum design cooling load.

2. An evaporator for a refrigerant comprising:
   an evaporator core having a plurality of spaced, hydraulically parallel flow paths, each defined by one or more elongated tubes, each tube having an inlet end and an opposed outlet end, said tubes being spaced from and parallel to each other, and fins extending between at least some of said tubes;
   an inlet fitting through which refrigerant may be introduced into the evaporator;
   an outlet fitting from which refrigerant may exit the evaporator;
   distributor means interconnecting said inlet fitting and at least some of said inlet ends for distributing refrigerant from the inlet to the associated tubes; and
   collector means interconnecting said outlet fitting and at least some of said outlet ends for collecting refrigerant passing from the associated tubes;
   said distributor means and said collector means further defining equalizing means for at least nominally equalizing the length of travel of refrigerant flowing from said inlet fitting to said outlet fitting through each of said plurality of flow paths;
   said core including central tubes flanked by end tubes, the refrigerant travel length from one of said fittings through the associated distributor or collector means to the corresponding tube ends is shorter for said central tubes than for said end tubes and the refrigerant travel length from the other of said fittings through its associated distributor or collector means to the corresponding tube ends is greater for said central tubes than for said end tubes.

3. An evaporator for a refrigerant comprising:
   an evaporator core having a plurality of spaced, hydraulically parallel flow paths, each defined by one or more elongated tubes, each tube having an inlet end and an opposed outlet end, said tubes being spaced from and parallel to each other, and fins extending between at least some of said tubes;
   an inlet fitting through which refrigerant may be introduced into the evaporator;
   an outlet fitting from which refrigerant may exit the evaporator;
   distributor means interconnecting said inlet fitting and at least some of said inlet ends for distributing refrigerant from the inlet to the associated tubes; and
   collector means interconnecting said outlet fitting and at least some of said outlet ends for collecting refrigerant passing from the associated tubes;
   said distributor means and said collector means further defining equalizing means for at least nominally equalizing the length of travel of refrigerant flowing from said inlet fitting to said outlet fitting through each of said plurality of flow paths;
   said core including central tubes flanked by end tubes, the refrigerant travel length from said inlet fitting through the distributor means to the tube inlet ends being shorter for said central tubes than for said end tubes and the refrigerant travel length from said outlet fitting to the collector means from the tube outlet ends being greater for said central tube than from said end tubes.

4. An evaporator for a refrigerant comprising:
   an evaporator core having a plurality of spaced, hydraulically parallel flow paths, each defined by one or more elongated tubes, each tube having an inlet end and an opposed outlet end, said tubes being spaced from and parallel to each other, and fins extending between at least some of said tubes;
   an inlet fitting through which refrigerant may be introduced into the evaporator;
   an output fitting from which refrigerant may exit the evaporator;
   distributor means interconnecting said inlet fitting and at least some of said inlet ends for distributing refrigerant from the inlet to the associated tubes; and
   collector means interconnecting said outlet fitting and at least some of said outlet ends for collecting refrigerant passing from the associated tubes;
   said distributor means and said collector means further defining equalizing means for at least nominally equalizing the length of travel of refrigerant flowing from said inlet fitting to said outlet fitting through each of said plurality of flow paths;
   said distributor means including an impingement surface on which incoming refrigerant from said inlet fitting impinges, and a plurality of passages disposed about said impingement surface to receive refrigerant from said surface and each extending to a predetermined one or ones of said inlet ends, some of said passages being of longer length than others of said passages; and said collector means including at least two spaced collection points in fluid communication with said some outlet ends and connected to said outlet fixture.

5. An evaporator for a refrigerant including
an evaporator core including at least one row of spaced parallel tubes terminating in open ends disposed in a header plate and having fins extending between said tubes;
a divider plate sealed against said header plate and having a row of spaced apertures therein, there being one aperture for each tube or a group of tubes in a tube row and each aligned with the corresponding tube or group of tubes in the tube row;
circuit and distributor plate means sealed against said divider plate oppositely of said header plate and having a plurality of slots therein; one end of each of said slots being aligned with and in fluid communication with a corresponding one or a predetermined group of said apertures, the other ends of said slots being angularly spaced about an opening, said opening being aligned with an imperforate section on one of said plates and defining a flat impingement surface;
a cover plate sealed against said circuit and distribution plate means and closing said opening oppositely of said impingement surface; and
means in said cover plate aligned with said opening serving as a refrigerant inlet to said evaporator and for directing incoming refrigerant generally centrally of said opening and against said impingement surface generally normally thereto.

6. The evaporator of claim 5 wherein said circuit and distributor plate means includes a circuit plate having said slots and a distributor plate having said opening, said circuit plate and said distributor plate being abutted and sealed together.

7. The evaporator of claim 5 wherein there are at least two rows of said tubes having said open ends terminating in said header plate and further including a manifold plate located between said header plate and said divider plate, said manifold plate having openings establishing fluid communication between the apertures in said divider plate and a corresponding one of a predetermined group of the open ends of tubes in one of said tube rows, and an elongated outlet slot aligned with the open ends of the tubes in the other of said tube rows; and at least one outlet conduit connected to said outlet slot.

8. The evaporator of claim 7 wherein said outlet conduit has a single outlet opening and is connected to said outlet slot at two spaced locations along the length of said outlet slot.

9. The evaporator of claim 8 wherein said spaced locations are at opposite ends of said outlet slot.

* * * * *